(12) United States Patent
Kitayoshi et al.

(10) Patent No.: US 9,399,311 B2
(45) Date of Patent: Jul. 26, 2016

(54) ELECTRODE PASTE MANUFACTURING METHOD, MANUFACTURING SYSTEM, AND SECONDARY BATTERY

(71) Applicants: Masanori Kitayoshi, Toyota (JP); Atsushi Sugihara, Toyota (JP)

(72) Inventors: Masanori Kitayoshi, Toyota (JP); Atsushi Sugihara, Toyota (JP)

(73) Assignee: Toyota Jidosha Kabushiki Kaisha, Toyota-shi, Aichi-ken (JP)

(*) Notice: Subject to any disclaimer, the term of this patent is extended or adjusted under 35 U.S.C. 154(b) by 453 days.

(21) Appl. No.: 13/933,445

(22) Filed: Jul. 2, 2013

(65) Prior Publication Data

US 2014/0010037 A1 Jan. 9, 2014

(30) Foreign Application Priority Data

Jul. 5, 2012 (JP) .................................. 2012-151920

(51) Int. Cl.
- *B29B 7/48* (2006.01)
- *B29C 47/66* (2006.01)
- *H01M 4/04* (2006.01)
- *H01M 4/62* (2006.01)

(52) U.S. Cl.
CPC ............... *B29B 7/488* (2013.01); *B29C 47/662* (2013.01); *H01M 4/04* (2013.01); *H01M 4/621* (2013.01)

(58) Field of Classification Search
CPC ......... B29B 7/488; H01M 4/04; H01M 4/621
USPC .......................................................... 366/75
See application file for complete search history.

(56) References Cited

U.S. PATENT DOCUMENTS

2002/0136948 A1* 9/2002 Missling ................ H01M 4/04
429/212

FOREIGN PATENT DOCUMENTS

| CN | 101604741 | 12/2009 |
|----|-----------|---------|
| JP | 2001-87698 | 4/2001 |
| JP | 2006-84979 | 3/2006 |
| JP | 2011-224435 | 11/2011 |

* cited by examiner

*Primary Examiner* — David Sorkin
(74) *Attorney, Agent, or Firm* — Finnegan, Henderson, Farabow, Garrett & Dunner, LLP

(57) ABSTRACT

The present invention relates to an electrode paste manufacturing system that includes, a twin screw extrusion mixer, a mohno pump that is connected at an inlet thereof to an outlet of the twin screw extrusion mixer, a deaerating tank that is connected to an outlet of the mohno pump, and a vacuum pump that is connected at an inlet thereof to the deaerating tank. The vacuum pump is configured such that a conduit system on the deaerating tank side of an airtight line formed at a contact portion between a rotor and a stator of the mohno pump is a closed system with the airtight line being a boundary.

6 Claims, 11 Drawing Sheets

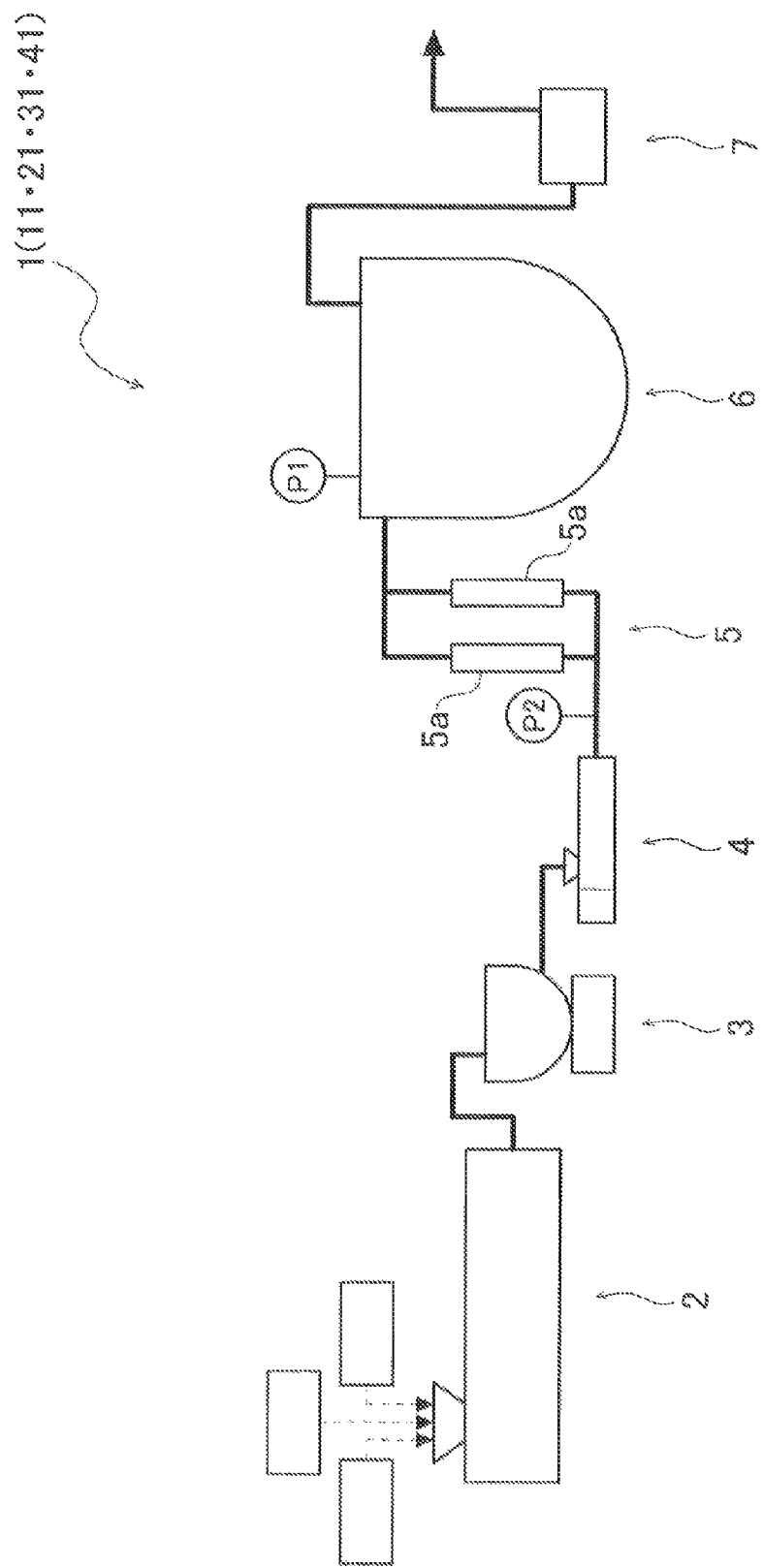
F I G . 1

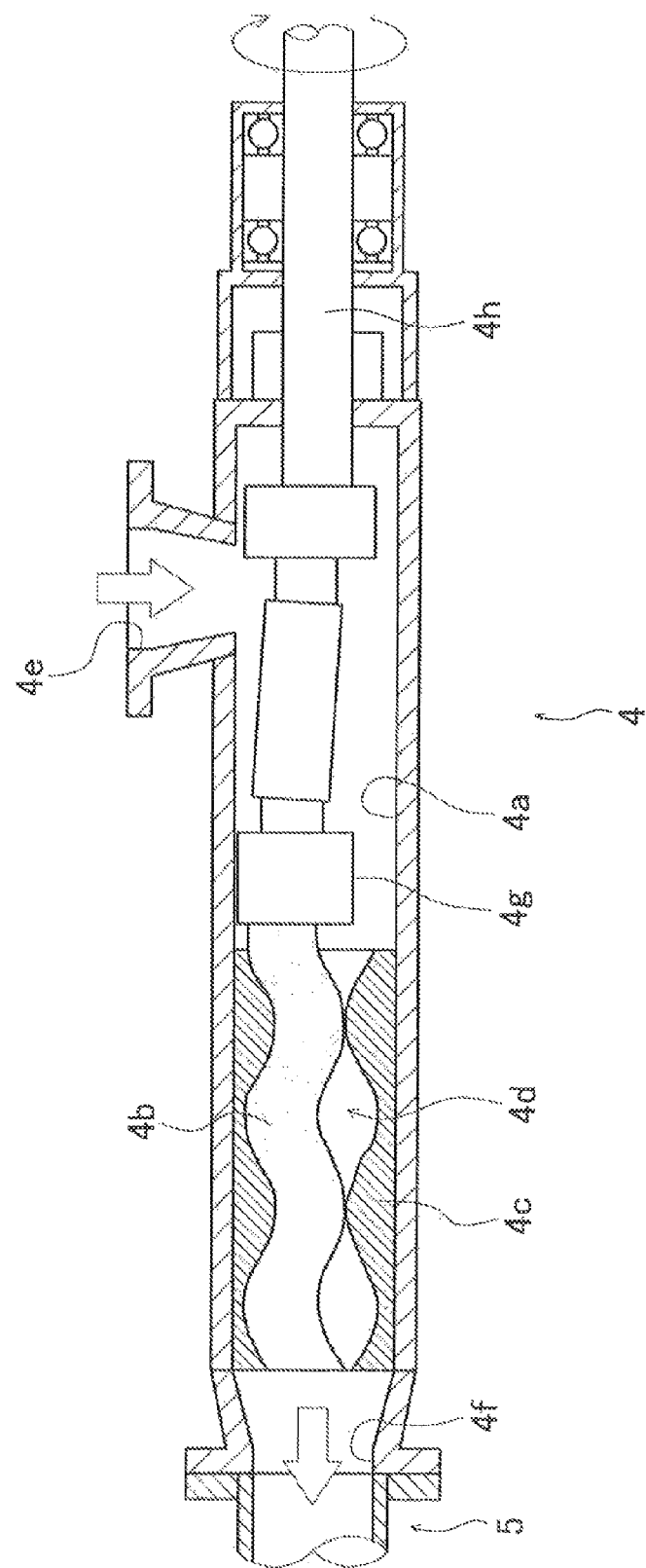
F I G . 2

F I G . 3
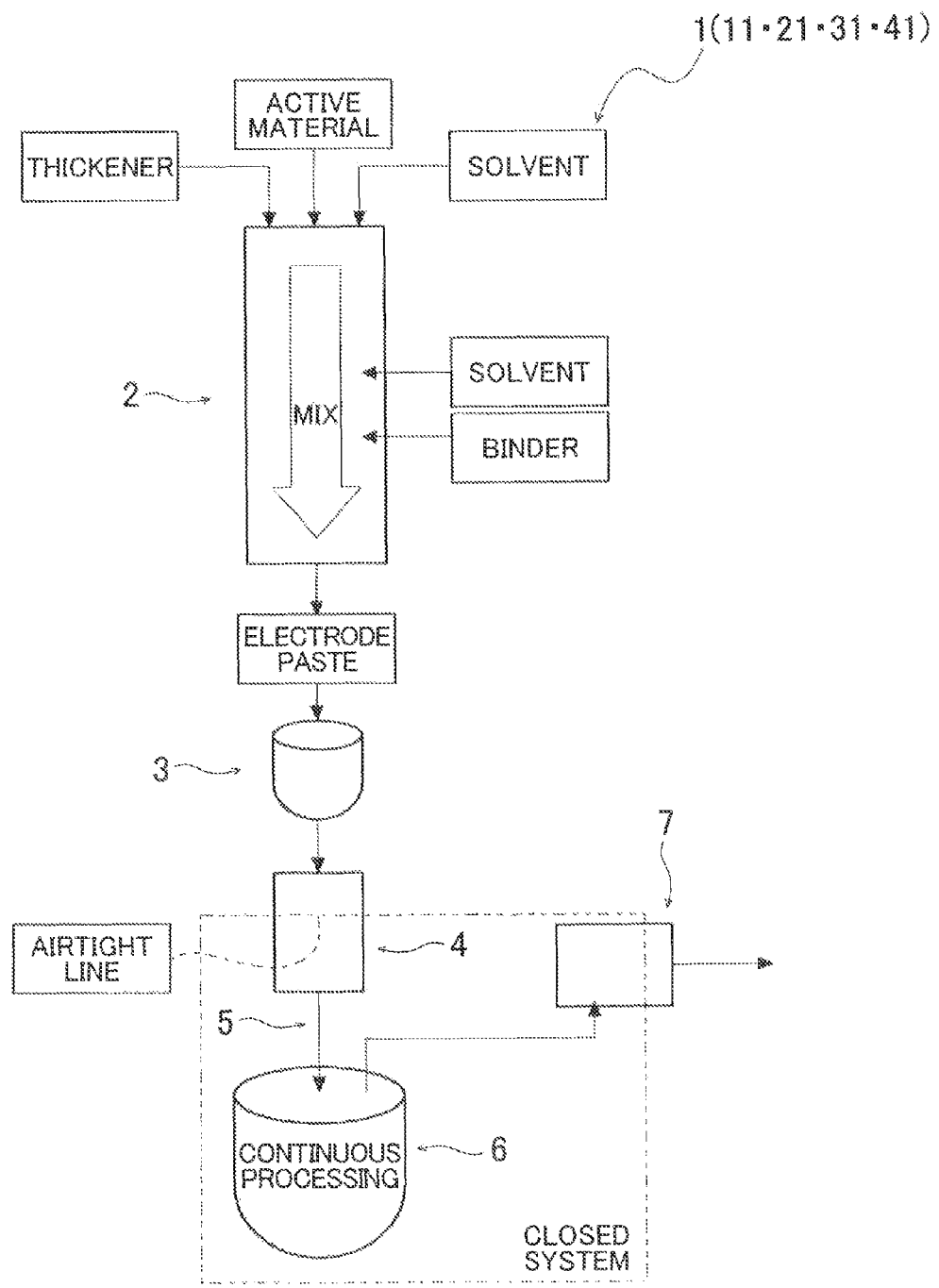

F I G . 8A
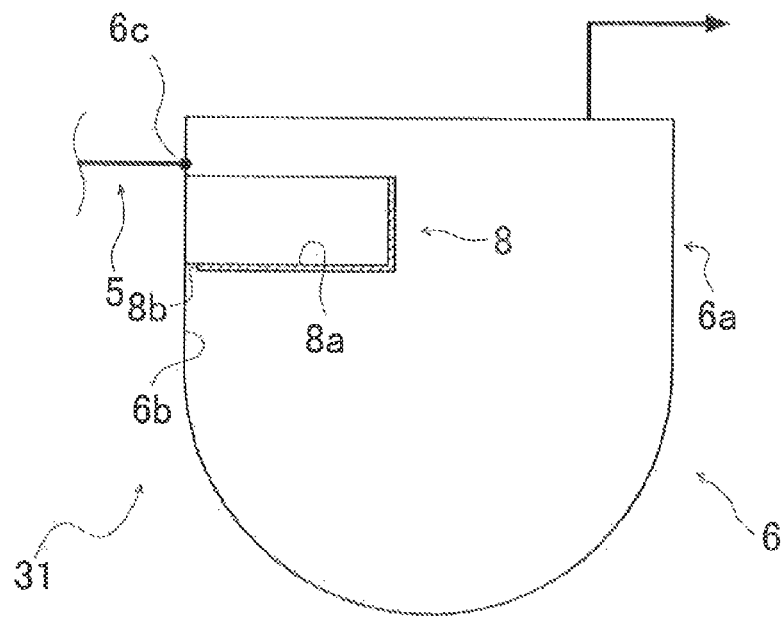
F I G . 8B
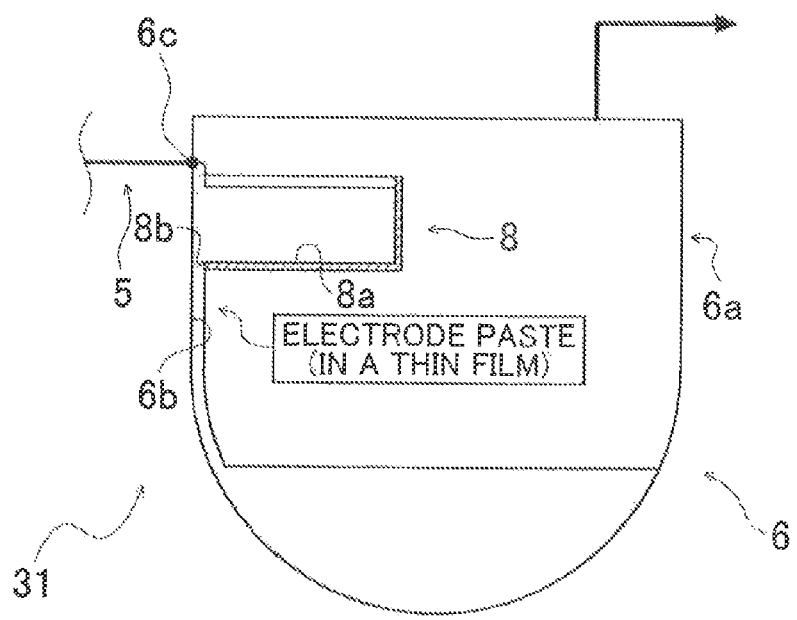

FIG. 11

| | RELATED ART | PATTERN (1) | PATTERN (2) | PATTERN (3) | PATTERN (4) | PATTERN (5) |
|---|---|---|---|---|---|---|
| PASTE VISCOSITY (mPa × s) | 2350 | 2450 | 2450 | 2450 | 2450 | 2450 |
| NUMBER OF BUBBLES IN PASTE (NUMBER) | 300 OR MORE | 78 | 45 | 52 | 62 | 27 |
| AMOUNT OF PASTE REMAINING | 10% | 2% OR LESS | 2% OR LESS | 2% OR LESS | 2% OR LESS | 2% OR LESS |
| NUMBER OF COATING DEFECTS (NUMBER) | 100 OR MORE | 8 | 3 | 4 | 6 | 2 |

ELECTRODE PASTE MANUFACTURING METHOD, MANUFACTURING SYSTEM, AND SECONDARY BATTERY

INCORPORATION BY REFERENCE

The disclosure of Japanese Patent Application No. 2012-151920 filed on Jul. 5, 2012 including the specification, drawings and abstract is incorporated herein by reference in its entirety.

BACKGROUND OF THE INVENTION

1. Field of the Invention

The invention relates to technology of an electrode paste manufacturing method, and a manufacturing system for realizing the manufacturing method, and a secondary battery manufactured using the electrode paste manufactured according to the manufacturing method.

2. Description of Related Art

Technology for producing an electrode paste using a twin shaft extrusion mixer in order to produce good quality (i.e., homogeneous) electrode paste is known. This technology is described in Japanese Patent Application Publication No. 2011-224435 (JP 2011-224435 A), for example, and is well known.

JP 2011-224435 A describes a mixer (i.e., a twin screw extrusion mixer) that is equipped with a hollow barrel and two rotating shafts provided parallel a predetermined distance apart from one another in a mixing chamber formed inside the barrel. A binder injecting portion that is supplied with binder is arranged downstream, in a powder transfer direction, of a powder injecting portion that is supplied with powder, in the mixing chamber of the mixer. A powder processing portion that is equipped with a spacer that is provided on the rotating shafts and compresses the powder is arranged between the powder injecting portion and the binding injecting portion. A good quality (i.e., homogeneous) paste is able to be produced by producing an electrode mixture (i.e., an electrode paste) using this kind of twin screw extrusion mixer.

When manufacturing electrode paste using a twin screw extrusion mixer such as that described in JP 2011-224435 A, the inside of the twin screw extrusion mixer is not airtight (i.e., it is an open system), so all of the produced electrode paste that is discharged from the twin screw extrusion mixer must first be received by a tank and then be batch processed before it is introduced into a closed system (i.e., a deaerating tank) for vacuum deaeration. Thus, when producing electrode paste using a twin screw extrusion mixer, the production time is increased by the amount of time required for the batch processing, so when using a twin screw extrusion mixer, it is difficult to shorten the time that it takes to produce electrode paste.

Also, in recent years, various technologies for reducing the amount of solvent in electrode paste have been examined in attempt to reduce the manufacturing cost of secondary batteries or reduce the environmental load and the like.

With electrode paste, if bubbles are mixed into the paste, they may cause problems (transparency) when a coat of the electrode paste is applied. Therefore, a vacuum deaerating process is performed on the electrode paste to remove the bubbles in the electrode paste. However, if the amount of solvent is reduced and the solid fraction of the electrode paste increases, it is difficult to remove the bubbles, which is problematic. For example, if the amount of solvent is reduced and the solid fraction of the electrode paste is 50% or more, the viscosity of the electrode paste increases. Also, when the viscosity of the electrode paste is high, it is difficult to remove the bubbles in the electrode paste.

Therefore, when using a high viscosity electrode paste in which the amount of solvent has been reduced, even after the vacuum deaerating process is performed, a supernatant (i.e., top) portion that includes a large amount of bubbles is not used, only the portion with few bubbles is used. Therefore, the yield of the electrode paste ends up being poor, so manufacturing cost of the electrode paste has been unable to be reduced as hoped.

SUMMARY OF THE INVENTION

The invention thus provides an electrode paste manufacturing method that is capable of easily and reliably removing bubbles, with respect to an electrode paste in which the amount of solvent has been reduced (such that a solid factor is 50% or more, for example) when producing an electrode paste with a twin screw extrusion mixer, a manufacturing system that realizes this manufacturing method, and a secondary battery manufactured using the electrode paste produced according to this manufacturing method.

A first aspect of the invention relates to an electrode paste manufacturing method using a twin screw extrusion mixer. This manufacturing method includes evacuating a deaerating tank to which an outlet of a mohno pump is connected, by a vacuum pump that is connected at an inlet thereof to the deaerating tank, such that a conduit system on the deaerating tank side of an airtight line formed at a contact portion between a rotor and a stator of the mohno pump is a closed system with the airtight line being a boundary, an inlet of the mohno pump being connected to an outlet of a twin screw extrusion mixer; and continuously vacuum deaerating the electrode paste inside the conduit system on the deaerating tank side of the airtight line and inside the deaerating tank, by transferring the electrode paste to the deaerating tank using the mohno pump, while keeping the conduit system on the deaerating tank side of the airtight line in a vacuum state.

The conduit system from the mohno pump to the deaerating tank is able to be a closed system by transferring the electrode paste using the mohno pump, so the vacuum deaerating process is able to be continuously performed without batch processing. As a result, the amount of time required for vacuum deaerating the electrode paste is able to be shortened.

The deaerating tank may be evacuated by the vacuum pump such that the electrode paste is made to flow down along an inner wall surface of the deaerating tank so as to form a thin film of the electrode paste on the inner wall surface, and is then collected in a bottom portion of the deaerating tank.

The manufacturing method described above may also include popping bubbles that appear in the thin film by discharging solvent toward the thin film with a nozzle provided in the deaerating tank and striking the bubbles with the solvent.

The bubbles that appear in the thin film may be popped by reducing a concentration of surfactant in the thin film by discharging solvent toward the inside of the deaerating tank by a nozzle provided in the deaerating tank and increasing a content ratio of the solvent in the thin film.

The deaerating tank may include a retaining member that stands erect from the inner wall surface and retains the electrode paste. Also, a slit portion that is a gap of a predetermined width is provided between the retaining member and the inner wall surface, and the deaerating tank may be evacuated by the vacuum pump, such that the electrode paste that flows down along the inner wall surface passes through the slit portion. As used herein, "width" refers to the gap's dimension in a direction perpendicular to a longitudinal direction of the slit portion.

The deaerating tank may include a collecting portion that temporarily collects the electrode paste that has flowed into the deaerating tank. The collecting portion may have an inclined portion that is a plate-shaped member that is connected to an edge over which the collected electrode paste overflows from the collecting portion, and inclines toward a lower side of the deaerating tank, and a dam member that stands erect from the inclined portion and retains the electrode paste that flows down the inclined portion. A slit portion that is a gap of a predetermined width may be provided between the dam member and the inclined portion, and the deaerating tank may be evacuated by the vacuum pump such that the electrode paste that flows down along the inclined portion passes through the slit portion.

Accordingly, bubbles in the electrode paste are able to be reliably popped.

A second aspect of the invention relates to an electrode paste manufacturing system. This electrode paste manufacturing system includes a twin screw extrusion mixer; a mohno pump that is connected at an inlet thereof to an outlet of the twin screw extrusion mixer; a deaerating tank that is connected to an outlet of the mohno pump; and a vacuum pump that is connected at an inlet thereof to the deaerating tank, and is configured such that a conduit system on the deaerating tank side of an airtight line formed at a contact portion between a rotor and a stator of the mohno pump is a closed system with the airtight line being a boundary.

The conduit system from the mohno pump to the deaerating tank is able to be a closed system by transferring the electrode paste using the mohno pump, so the vacuum deaerating process is able to be continuously performed without batch processing. As a result, the amount of time required for the vacuum deaerating process of the electrode paste is able to be shortened.

The deaerating tank may include a body portion that forms an inner wall surface that causes the electrode paste to flow downward, and an inlet for introducing the electrode paste into the deaerating tank may be formed above the body portion.

The deaerating tank may include a nozzle that discharges solvent that forms the electrode paste toward the inner wall surface of the deaerating tank.

The deaerating tank may include a retaining member that stands erect from a perpendicular inner wall surface of the deaerating tank and retains the electrode paste, and a slit portion that is a gap of a predetermined width may be provided between the retaining member and the inner wall surface.

The deaerating tank may include a collecting portion that temporarily collects the electrode paste that has flowed into the deaerating tank. The collecting portion may have an inclined portion that is a plate-shaped member that is connected to an edge over which the collected electrode paste overflows from the collecting portion, and inclines toward a lower side of the deaerating tank, and a dam member that stands erect from the inclined portion and retains the electrode paste that flows down the inclined portion. Also, a slit portion that is a gap of a predetermined width may be provided between the dam member and the inclined portion.

Accordingly, bubbles in the electrode paste are able to be reliably popped.

A third aspect of the invention relates to a secondary battery manufactured using the electrode paste manufactured according to the manufacturing method of the first aspect, or manufactured using the electrode paste manufactured using the manufacturing system of the second aspect.

The electrode paste manufactured according to the manufacturing method of the first aspect, and the electrode paste manufactured using the manufacturing system of the second aspect enable a higher quality secondary battery than the related art to be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 1 is a view showing a frame format of the overall structure of an electrode paste manufacturing system according to a first example embodiment of the invention;

FIG. 2 is a view showing a frame format of a mohno pump provided in the electrode paste manufacturing system according to the example embodiment of the invention;

FIG. 3 is a view showing a frame format of the flow of steps for manufacturing an electrode paste when using the electrode paste manufacturing system according to the example embodiment of the invention;

FIG. 8A is a view showing a frame format of the structure of a deaerating tank in an electrode paste manufacturing system according to a fourth example embodiment of the invention;

FIG. 8B is a view showing a frame format of a deaerating state by the electrode paste manufacturing system according to the fourth example embodiment of the invention;

FIG. 11 is a view showing a comparison of the property of the electrode paste manufactured using the electrode paste manufacturing system (of the first to fifth example embodiments) of the invention, and the property of a related electrode paste.

DETAILED DESCRIPTION OF EMBODIMENTS

Figure 4:
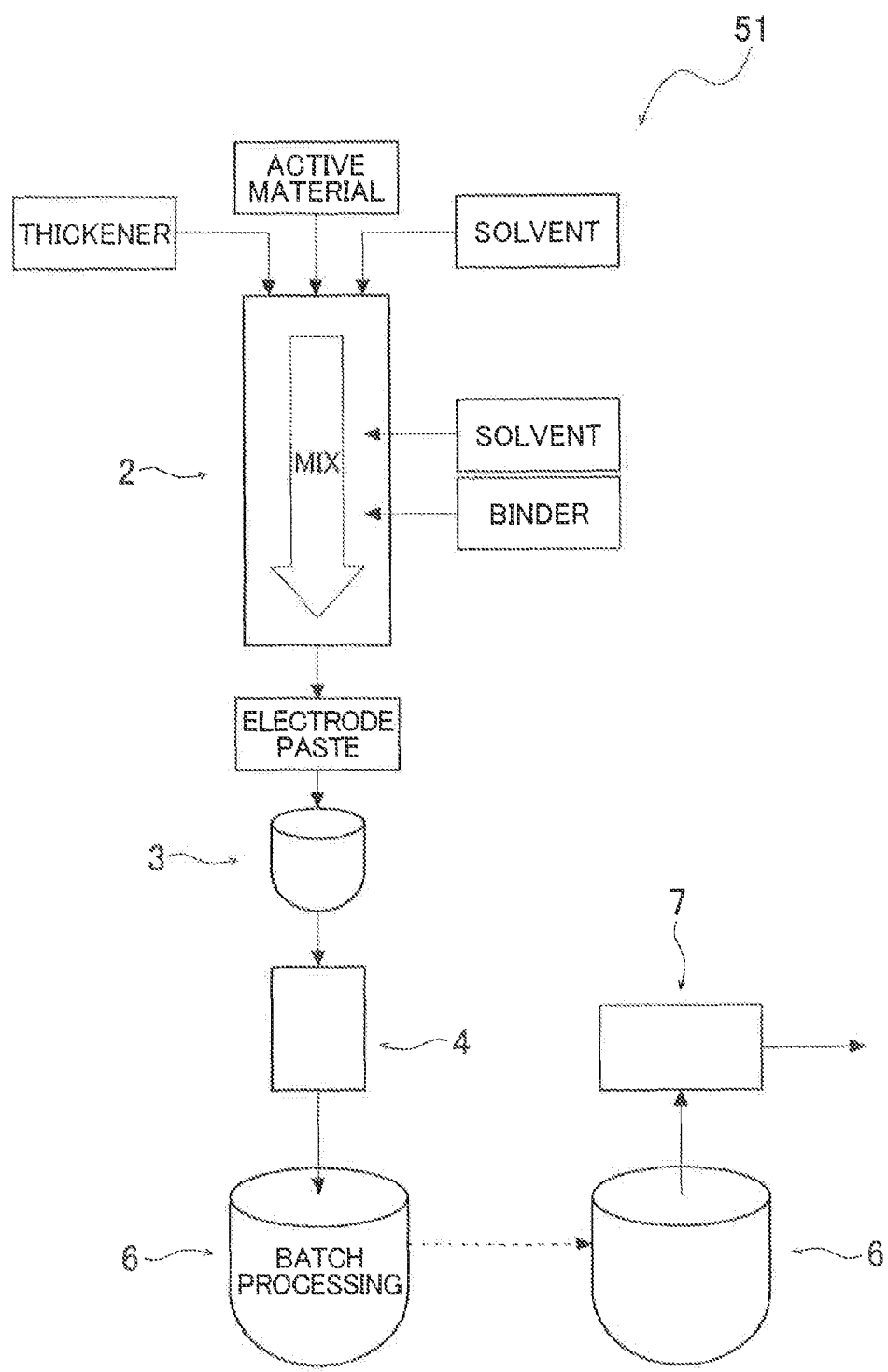
FIG. 4 is a view showing a frame format of the flow of steps for manufacturing an electrode paste when using a related electrode paste manufacturing system.

The overall structure of an electrode paste manufacturing system according to a first example embodiment of the invention will now be described with reference to FIGS. 1 to 5. As shown in FIG. 1, an electrode paste manufacturing system 1 according to the first example embodiment is a system for manufacturing an electrode paste, and includes a twin screw extrusion mixer 2, a buffer tank 3, a mohno pump 4, a deaerating tank 6, and a vacuum pump 7 and the like. Also, an electrode paste manufacturing method according to the first example embodiment is able to be realized by manufacturing electrode paste using the electrode paste manufacturing system 1.

The twin screw extrusion mixer 2 is an apparatus used to mix a plurality of types of powders and liquids, and includes a hollow barrel, not shown, and two rotating shafts, also not shown, provided parallel at a predetermined distance from each other in a mixing chamber, also not shown, formed inside the barrel. Also, in the twin screw extrusion mixer 2, powders (active material and a thickener) and a liquid (solvent) are supplied to the mixing chamber. The powders and liquid are transported while being extruded or the like. Also, during mixing, additional liquid (solvent) and powder (binder) are supplied to the mixing chamber, and the powders and liquid are transported while being further extruded or the like. The powder and liquid are mixed, are an electrode paste is produced (see FIG. 3). In this example embodiment, a liquid or powder surfactant is supplied to the mixing chamber.

The buffer tank 3 is a tank for temporarily collecting the electrode paste produced by the twin screw extrusion mixer 2, before the electrode paste is introduced to the mohno pump 4. The buffer tank 3 serves to absorb fluctuations in the discharge amount of electrode paste that is discharged from the twin screw extrusion mixer 2. Therefore, the buffer tank 3 may also be omitted if the amount of electrode paste discharged from the twin screw extrusion mixer 2 and the amount of electrode paste supplied by the mohno pump 4 are controlled so that they match, for example.

The mohno pump 4 is a pump that is classified as a rotary displacement type progressing cavity pump, and is used as an apparatus for moving the electrode paste produced by the twin screw extrusion mixer 2 toward the deaerating tank 6.

As shown in FIG. 2, the mohno pump 4 is a pump with a structure having a rotor 4b and a stator 4c inside of a casing 4a. The rotor 4b is a metal rod-shaped body that is curved in a generally helical shape with a predetermined angle of twist. The rotor 4b has a circular cross-section at all locations. Also, the stator 4c is made of elastic material (such as EPDM) that has a cavity formed in it for inserting the rotor 4b.

Also, when the rotor 4b is inserted into the cavity of the stator 4c, a helical-shaped space that is sealed by a tangential line is formed between the stator 4c and the rotor 4b. This space forms a plurality of individual cavities 4d that are closed (i.e., sealed) spaces. In other words, with the mohno pump 4, an airtight line that ensures airtightness on a primary side and a secondary side of the mohno pump 4 is formed by a portion where the rotor 4b contacts the stator 4c.

Also, an inlet 4e for introducing electrode paste into the casing 4a, and an outlet 4f for discharging electrode paste from the casing 4a, are provided in the casing 4a of the mohno pump 4. As shown in FIG. 1, the inlet 4e side of the mohno pump 4 is connected to the buffer tank 3, and the outlet 4f of the mohno pump 4 is connected to the deaerating tank 6 by a conduit 5. Filters 5a for removing foreign matter in the electrode paste are provided in the conduit 5.

Furthermore, as shown in FIG. 2, in the mohno pump 4, the rotor 4b is connected via a universal joint 4g to a rotating shaft 4h that is securely fixed to a shaft of a motor, not shown. The rotor 4b is able to be rotated inside the stator 4c by operating the motor.

Also, when the rotor 4b rotates inside the stator 4c, electrode paste introduced into the casing 4a from the inlet 4e is drawn into the upstream-most cavity 4d (having an end portion that is open) in the transfer direction, and when the rotor 4b is rotated still further in the stator 4c, the cavities 4d move toward the outlet 4f side of the mohno pump 4. That is, in the mohno pump 4, the electrode paste that has been drawn into the cavities 4d is transferred continuously in the direction of the outlet 4f, and ultimately discharged from the outlet 4f.

In this way, with the mohno pump 4, the plurality of independent cavities 4d are formed as spaces between the rotor 4b and the stator 4c. Airtightness is ensured at the contact positions (tangential positions) of the rotor 4b and the stator 4c between the cavities 4d.

Therefore, with the electrode paste manufacturing system 1, a conduit system on the primary side of the airtight line is an open system that is communicated with the twin screw extrusion mixer 2 and the buffer tank 3, while the conduit system on the secondary side of the airtight line is able to be a closed system, with the airtight line in the mohno pump 4 (i.e., the contact positions of the rotor 4b and the stator 4c) as the boundary between the two systems.

The deaerating tank 6 is a vessel for collecting the electrode paste, and is a piece of equipment for popping bubbles by reducing the pressure in the deaerating tank 6 (to approximately −90 kPa, for example), and expanding the bubbles that are mixed into the electrode paste.

Also, the vacuum pump 7 is connected to the deaerating tank 6, and is a piece of equipment for evacuating the inside of the deaerating tank 6. The vacuum pump 7 has the ability to create a vacuum in the deaerating tank 6 of up to approximately −90 kPa. Also, in the electrode paste manufacturing system 1, the conduit path from the deaerating tank 6 to the mohno pump 4 is a closed system, so the vacuum (pressure P1 in FIG. 1) on the secondary side of the filters 5a can be set to approximately −90 kPa, and the vacuum on the primary side of the filters 5a can be set to approximately −35 kPa.

As shown in FIG. 4, when a related electrode paste manufacturing system 51 is used, electrode paste produced by the twin screw extrusion mixer 2 is received by the buffer tank 3, and then transferred from the buffer tank 3 to the deaerating tank 6 by the mohno pump 4. When electrode paste produced in the deaerating tank 6 is transferred by the mohno pump 4 in this way, all of the electrode paste is first collected in the deaerating tank 6 (i.e., is batch processed), and then the electrode paste is deaerated to remove the bubbles by evacuating the inside of the deaerating tank 6 using the vacuum pump 7.

On the other hand, as shown in FIG. 3, when the electrode paste manufacturing system 1 is used, the conduit system on the secondary side of the airtight line of the mohno pump 4 is a closed system, so the electrode paste that is transferred toward the deaerating tank 6 is able to be continuously vacuum deaerated, without being batch processed, in the path (i.e., the conduit 5) from the mohno pump 4 to the deaerating tank 6.

Figure 5:
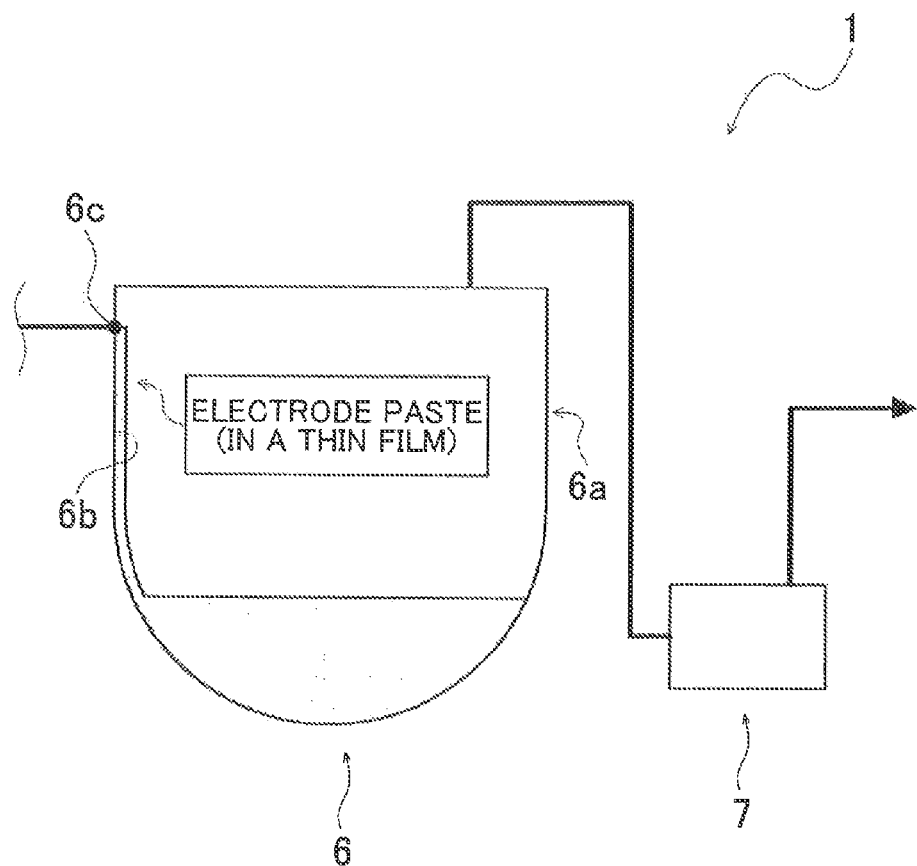
FIG. 5 is a view showing a frame format of a deaerating state in the electrode paste manufacturing system according to the first example embodiment of the invention.

Also, as shown in FIG. 5, an inlet 6c that is an opening for introducing electrode paste into the deaerating tank 6 and is communicated with the conduit 5, is formed in the deaerating tank 6. This inlet 6c is formed above a body portion 6a that is a generally circular cylindrical portion of the deaerating tank 6, and is configured such that electrode paste that is introduced into the deaerating tank 6 from the inlet 6c flows downward along an inner wall surface 6b of the body portion 6a that is a perpendicular inner wall surface 6b. The term "above" here is a concept that includes a portion above the body portion 6a and an upper portion of the body portion 6a, and need only be a position in which the electrode paste that has been introduced from the inlet 6c into the deaerating tank 6 is able to flow down along the inner wall surface 6b.

With this kind of configuration, the electrode paste that has been introduced into the deaerating tank 6 flows down while forming a thin film on the inner wall surface 6b of the body portion 6a, so bubble popping in the thin film that has been placed in a pressure-reduced state is promoted. As a result, the bubbles are reliably removed from the electrode paste before the electrode paste is collected in a bottom portion of the deaerating tank 6. The inner wall surface 6b of the body portion 6a down which the electrode paste flows is a perpendicular inner wall surface in this example embodiment, but the inner wall surface 6b may also be an inner wall surface that is inclined with respect to the perpendicular direction. That is, the inner wall surface 6b may also be an inner wall surface that is inclined just enough so that the electrode paste flows down while forming a thin film. However, the rate at which the electrode paste flows down is the fastest when the inner wall surface 6b is a perpendicular inner wall surface, so the time required for the deaerating process is able to be shortened, which is preferable.

That is, in the electrode paste manufacturing method according to the first example embodiment, a thin film of electrode paste is formed on the inner wall surface 6b and is then collected in the bottom portion of the deaerating tank 6 by having the electrode paste flow down along the perpendicular inner wall surface 6b (of the body portion 6a) of the deaerating tank 6. Also, in the electrode paste manufacturing system 1 according to the first example embodiment, the deaerating tank 6 is provided with the body portion 6a that forms the inner wall surface 6b that causes the electrode paste to flow downward, and the inlet 6c for introducing the electrode paste into the deaerating tank 6 is formed above the body portion 6a. This kind of structure makes it possible to reliably pop the bubbles in the electrode paste.

Figure 6:
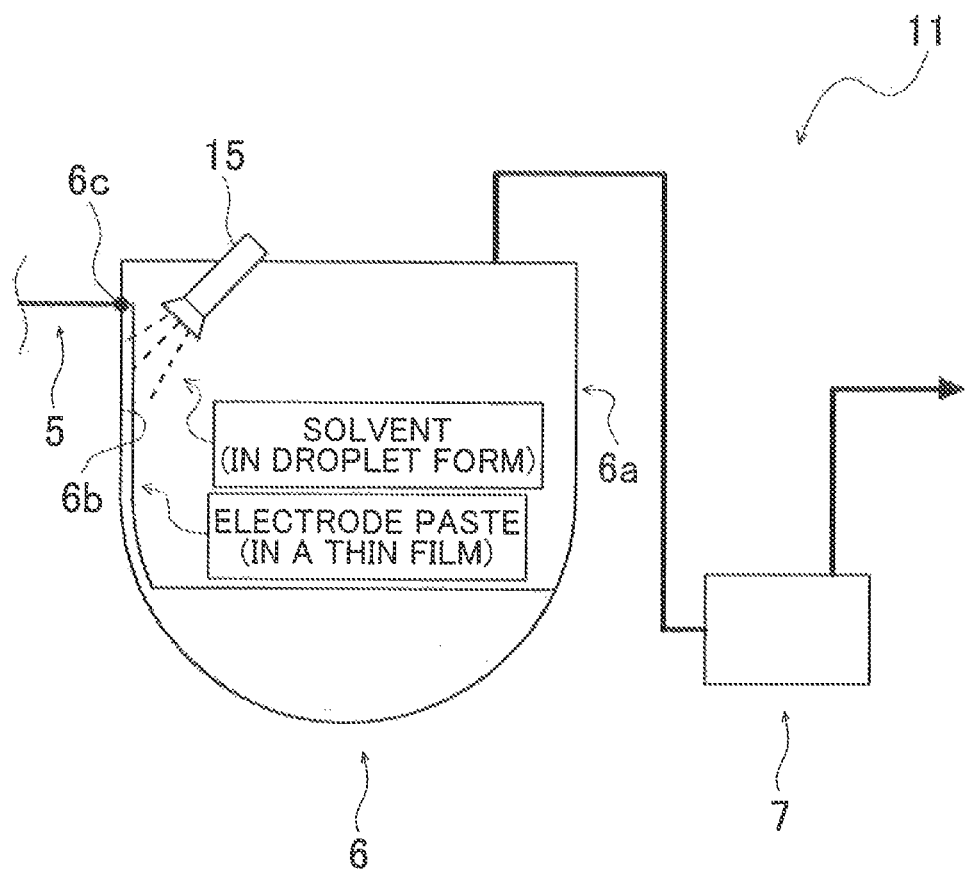
FIG. 6 is a view showing a frame format of a deaerating state in an electrode paste manufacturing system according to a second example embodiment of the invention.

Next, an electrode paste manufacturing system according to a second example embodiment of the invention will be described with reference to FIGS. 1 and 6. As shown in FIGS. 1 and 6, an electrode paste manufacturing system 11 of the second example embodiment differs from the electrode paste manufacturing system 1 according to the first example embodiment in that a nozzle 15 that is a device for discharging solvent is provided in the deaerating tank 6. The structure of the other portions is the same as it is in the electrode paste manufacturing system 1. Also, an electrode paste manufacturing method according to the second example embodiment is able to be realized by manufacturing electrode paste using the electrode paste manufacturing system 11 according to the second example embodiment.

The nozzle 15 is a member capable of discharging solvent in droplet form, and is connected to a solvent supplying apparatus such as a plunger pump, not shown. Also, the nozzle 15 is pointed in a direction such that it discharges solvent toward the inner wall surface 6b of the body portion 6a of the deaerating tank 6. The solvent in droplet form that is discharged from the nozzle 15 is able to strike the thin film of electrode paste that flows down along the inner wall surface 6b of the body portion 6a, as well as the bubbles that appear in this electrode paste.

Also, in the electrode paste manufacturing system 11, solvent is supplied to the nozzle 15 by a plunger pump or the like, and the solvent in droplet form is sprayed at the electrode paste that flows downward in a thin film on the inner wall surface 6b of the body portion 6a. As a result, the solvent in droplet form strikes the bubbles that appear in the thin film, so the bubbles are more reliably popped.

The amount of solvent used in the electrode paste manufacturing system 11 is limited to an amount so that a concentration of the solid component of the electrode paste is within a predetermined range, even if the amount of solvent injected into the twin screw extrusion mixer 2 is added to the amount of solvent supplied from the nozzle 15, taking into account a concentration of solid component of the resulted electrode paste.

That is, in the electrode paste manufacturing method according to the second example embodiment, the deaerating tank 6 is provided with the nozzle 15 for discharging solvent that forms the electrode paste toward the inner wall surface 6b of the body portion 6a. The solvent is discharged by the nozzle 15 toward the thin film and strikes the bubbles that appear in the thin film, popping them. This kind of structure enables the bubbles in the electrode paste to be reliably popped.

Figure 7:
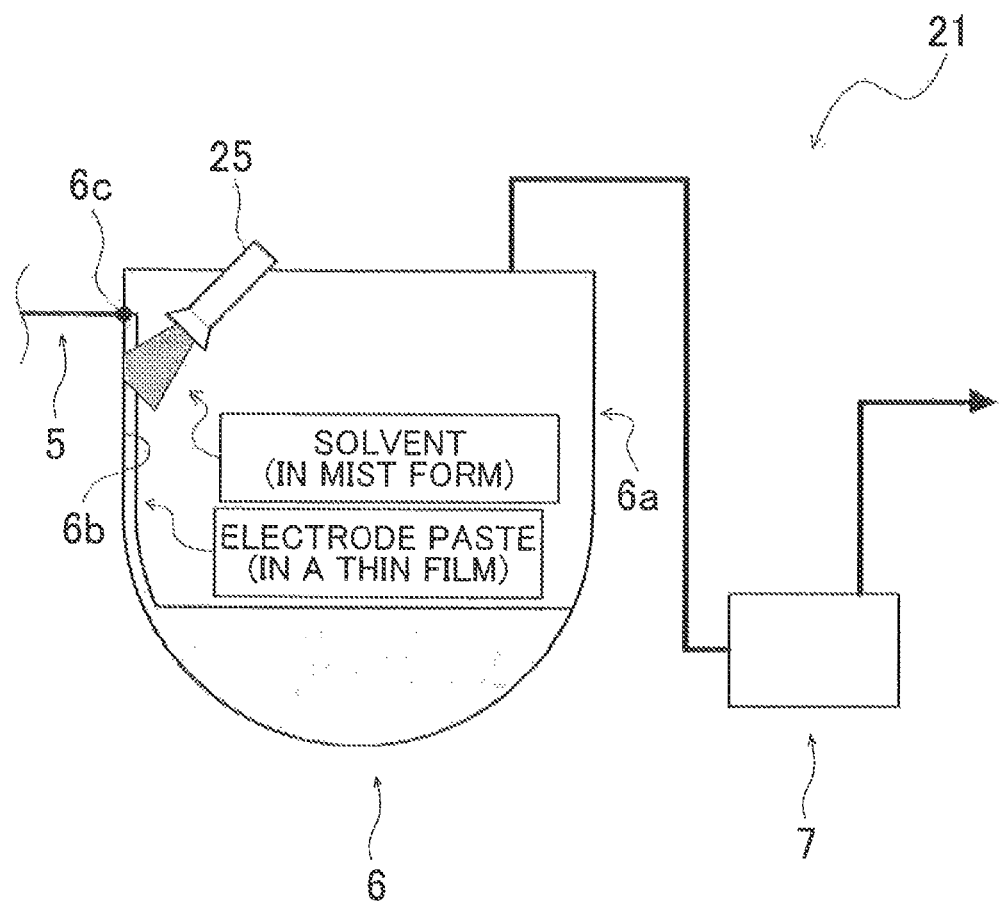
FIG. 7 is a view showing a frame format of a deaerating state in an electrode paste manufacturing system according to a third example embodiment of the invention.

Next, an electrode paste manufacturing system according to a third example embodiment of the invention will be described with reference to FIGS. 1 and 7. As shown in FIGS. 1 and 7, an electrode paste manufacturing system 21 of the third example embodiment differs from the other electrode paste manufacturing systems 1 and 11 described above in that a nozzle 25 that is a device that discharges solvent in mist form (i.e., atomized solvent) is provided in the deaerating tank 6. The structure of the other portions is the same as it is in the electrode paste manufacturing systems 1 and 11. Also, an electrode paste manufacturing method according to the third example embodiment is able to be realized by manufacturing electrode paste using the electrode paste manufacturing system 21 according to the third example embodiment.

The nozzle 25 is a member for discharging atomized solvent, and is connected to a solvent supplying apparatus such as a plunger pump, not shown. Also, the nozzle 25 is pointed in a direction such that it discharges solvent toward the inner wall surface 6b of the body portion 6a of the deaerating tank 6. The atomized solvent that is discharged from the nozzle 25 is able to be sprayed onto the thin film of the electrode paste that flows down along the inner wall surface 6b of the body portion 6a, as well as onto the bubbles that appear in this electrode paste.

Also, the nozzle 25 sprays the atomized solvent at the electrode paste that flows downward in a thin film on the inner wall surface 6b of the body portion 6a, and as a result, the atomized solvent contacts the bubbles that appear in the thin film of electrode paste, and enters the bubbles. When the solvent enters the bubbles, the concentration of surfactant in the bubbles is able to be reduced. When the concentration of surfactant falls below a predetermined concentration, the bubbles are no longer able to be maintained, and thus pop. That is, with the electrode paste manufacturing system 21, the bubbles that appear in the thin film of electrode paste are able to be popped even without applying impact force to them.

The amount of solvent used in the electrode paste manufacturing system 21 is limited to an amount that will be within the solid factor specified for the electrode paste, even if the amount of solvent injected into the twin screw extrusion mixer 2 is added to the amount of solvent supplied from the nozzle 25, taking into account the solid factor specified for the electrode paste. Also, in this example embodiment, the solvent discharged by the nozzle 25 is directed toward the inner wall surface 6b of the body portion 6a. However, as long as the atomized solvent is able to be filled into the deaerating tank 6, the nozzle 25 does not have to be pointed toward the inner wall surface 6b.

Also, an electrode paste manufacturing system may also be formed by combining the technical aspects of the electrode paste manufacturing system 11 according to the second example embodiment and the technical aspects of the electrode paste manufacturing system 21 according to the third example embodiment. That is, for example, popping of the bubbles may be further promoted by supplying solvent to the nozzle by a plunger pump or the like, spraying the solvent in droplet form at the electrode paste that flows downward in a thin film on the inner wall surface 6b of the body portion 6a, and striking the bubbles with the droplets of solvent, while also reducing the concentration of surfactant of the bubbles.

That is, in the electrode paste manufacturing method according to the third example embodiment, the deaerating tank 6 includes the nozzle 25 for discharging solvent that forms the electrode paste toward the inside of the deaerating tank 6. The bubbles that appear in the thin film are popped by reducing the concentration of surfactant in the thin film, which is achieved by discharging solvent into the deaerating tank 6 with the nozzle 25 and increasing the solvent content of the thin film. Also, in the electrode paste manufacturing system 11 according to the second example embodiment and the electrode paste manufacturing system 21 according to the third example embodiment, the deaerating tank 6 includes the nozzle 15 and 25 for discharging solvent that forms the electrode paste toward the perpendicular inner wall surface 6b of the body portion 6a. This kind of structure makes it possible to reliably pop the bubbles in the electrode paste.

Next, an electrode paste manufacturing system according to a fourth example embodiment of the invention will be described with reference to FIGS. 1 and 8A and 8B. As shown in FIGS. 1 and 8A, an electrode paste manufacturing system 31 of the fourth example embodiment differs from the other electrode paste manufacturing systems 1, 11, and 21 according to the first to the third example embodiments in that the deaerating tank 6 is provided with a bubble-popping portion 8 that has a collecting portion 8a for temporarily collecting the electrode paste, and a slit portion 8b that is an opening for discharging the electrode paste from the collecting portion 8a. Also, in the electrode paste manufacturing system 31, the structure of the other portions is the same as it is in the other electrode paste manufacturing systems 1, 11, and 21. Also, an electrode paste manufacturing method according to the fourth example embodiment is able to be realized by manufacturing electrode paste using the electrode paste manufacturing system 31 according to the fourth example embodiment.

As shown in FIG. 8B, with the electrode paste manufacturing system 31 according to the fourth example embodiment, the electrode paste introduced into the deaerating tank 6 from the inlet 6c is first temporarily collected in the collecting portion 8a of the bubble-popping portion 8.

The slit portion 8b that is a linear opening formed through in the vertical direction is formed in a portion of the collecting portion 8a that contacts the inner wall surface 6b of the body portion 6a. Therefore, electrode paste collected in the collecting portion 8a leaks from the slit portion 8b by its own weight and flows down along the inner wall surface 6b of the body portion 6a.

The slit portion 8b is formed as a gap having a dimension smaller than the diameter of the bubbles (i.e., the gap may have a dimension of approximately 100 μm, for example), such that bubbles in the electrode paste will pop when they pass through the slit portion 8b. As a result, the bubbles in the electrode paste are able to be reliably popped.

That is, in the electrode paste manufacturing method according to the fourth example embodiment, the deaerating tank 6 is provided with the bubble-popping portion 8 that stands erect from the inner wall surface 6b, and is a member for collecting electrode paste. The bubble-popping portion 8 has the slit portion 8b that is a gap of a predetermined width, at a portion contacting the inner wall surface 6b. Electrode paste that flows down along the inner wall surface 6b passes through this slit portion 8b. Also, in the electrode paste manufacturing system according to the fourth example embodiment, the deaerating tank 6 is provided with the bubble-popping portion 8 that stands erect from the perpendicular inner wall surface 6b of the deaerating tank 6, and is a member for collecting electrode paste. The bubble-popping portion 8 has the slit portion 8b that is a gap of a predetermined width, at a portion contacting the inner wall surface 6b. This kind of structure enables bubbles in the electrode paste to be reliably popped.

Figure 9A:
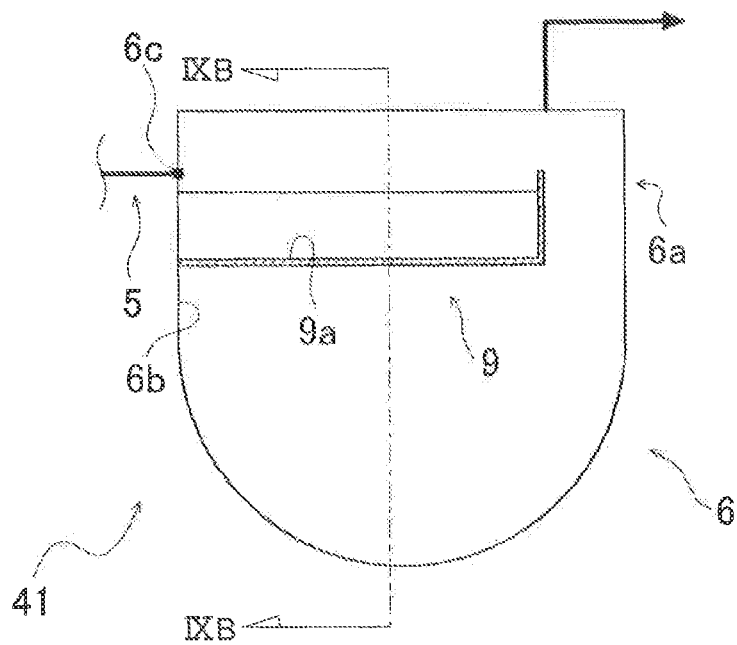
FIG. 9A is a side view showing a frame format of the structure of a deaerating tank in an electrode paste manufacturing system according to a fifth example embodiment of the invention.
Figure 9B:
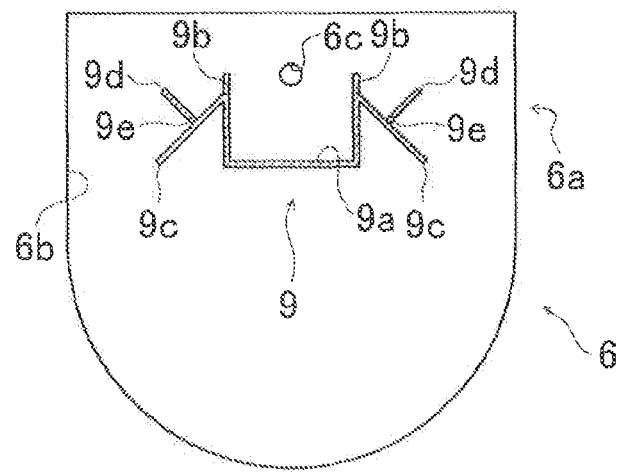
FIG. 9B is a sectional view taken along line IXB-IXB in FIG. 9A.

Next, an electrode paste manufacturing system according to a fifth example embodiment of the invention will be described with reference to FIGS. 1, 9A and 9B, and 10A and 10B. As shown in FIGS. 1, and 9A and 9B, the electrode paste manufacturing system 41 of the fifth example embodiment differs from the electrode paste manufacturing system 31 according to the fourth example embodiment in that the deaerating tank 6 is provided with a bubble-popping portion 9 having a collecting portion 9a for temporarily collecting electrode paste, and an inclined portion 9c that is a surface for spreading out electrode paste that has overflowed from the collecting portion 9a.

Further, the bubble-popping portion 9 includes a dam member 9d that retains the electrode paste that has spread out on the inclined portion 9c. Also, a slit portion 9e that is a linear opening through which the electrode paste passes is formed in the dam member 9d at a portion that contacts the inclined portion 9c. Also, in the electrode paste manufacturing system 41, the structure of the other portions is the same as it is in the other electrode paste manufacturing systems 1, 11, 21, and 31.

Also, an electrode paste manufacturing method according to the fifth example embodiment is able to be realized by manufacturing electrode paste using the electrode paste manufacturing system 41 according to the fifth example embodiment.

Figure 10A:
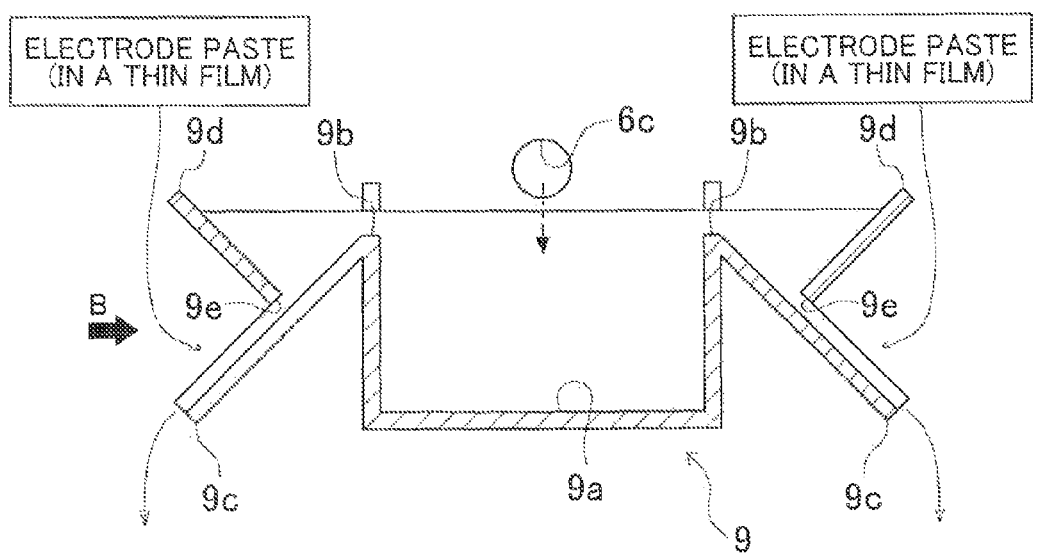
FIG. 10A is a view showing a frame format of a deaerating state, or more specifically, a bubble-popping state in a bubble-popping portion, in the electrode paste manufacturing system according to a fifth example embodiment of the invention.
Figure 10B:
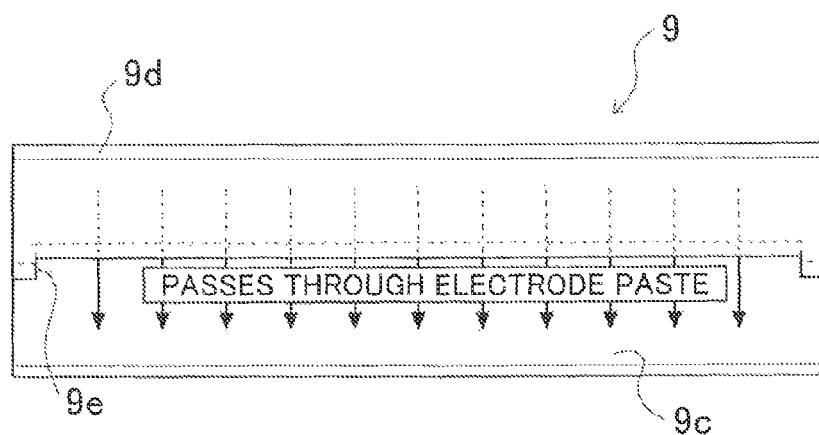
FIG. 10B is an arrow view in direction B in FIG. 10A.

As shown in FIGS. 10A and 10B, with the electrode paste manufacturing system 41, electrode paste introduced into the deaerating tank 6 from the inlet 6c is first temporarily collected in the collecting portion 9a of the bubble-popping portion 9. Then electrode paste that has overflowed from the collecting portion 9a flows down along the inclined portion 9c that is continuous with an overflow edge 9b of the collecting portion 9a.

Providing this kind of inclined portion 9c makes it possible to make the area of the portion for spreading the electrode paste into a thin film larger than it is with the inner wall surface 6b of the body portion 6a, so the vacuum deaerating process can be performed while spreading the electrode paste out in a thin film over an even greater area at one time.

Also, the dam member 9d that is a portion for retaining the electrode paste that flows down the inclined portion 9c is provided in a middle portion (an end portion is also fine) of the inclined portion 9c, and the slit portion 9e through which the electrode paste passes is formed between the dam member 9d and the inclined portion 9c.

The slit portion 9e is a linear opening, and is formed as a gap having a dimension smaller than the diameter of the bubbles in the electrode paste (i.e., a gap having a dimension of approximately 100 μm, for example). Thus, the bubbles in the electrode paste will pop when they pass through the slit portion 9e. As a result, the bubbles in the electrode paste are able to be reliably popped.

That is, in the electrode paste manufacturing method according to the fifth example embodiment, the deaerating tank 6 is provided with the collecting portion 9a that temporarily collects electrode paste that has flowed into the deaerating tank 6. The collecting portion 9a includes the inclined portion 9c that is continuous with the overflow edge 9b of the collecting portion 9a, and is a plate-shaped member for forming a downwardly inclined surface. The collecting portion 9a has the dam member 9d that stands erect from the inclined portion 9c, and is designed to retain electrode paste that has flowed down the inclined portion 9c. The slit portion 9e that is a gap of a predetermined width is provided between the dam member 9d and the inclined portion 9c. Electrode paste that flows down along the inclined portion 9c passes through this slit portion 9e. Also, in the electrode paste manufacturing system 41 according to the fifth example embodiment, the deaerating tank 6 includes the collecting portion 9a that temporarily collects electrode paste that has flowed into the deaerating tank 6. The collecting portion 9a includes the inclined portion 9c that is continuous with the overflow edge of the collecting portion 9a, and is a plate-shaped member for forming the downwardly inclined surface. The inclined portion 9c has the dam member 9d that stands erect from the inclined portion 9c, and is designed to retain electrode paste that has flowed down the inclined portion 9c. The dam member 9d has the slit portion 9e that is a gap of a predetermined width at a portion that contacts the inclined portion 9c. This kind of structure enables bubbles in the electrode paste to be reliably popped.

Here, a case is described in which each of the first to the fifth example embodiments of the invention are carried out separately, but the first to the fifth example embodiments may also be combined in various ways. Combining the example embodiments enables the bubbles in the electrode paste to be even more reliably popped by a synergistic effect.

Next, the property of a secondary battery manufactured using the electrode paste manufactured according to the electrode paste manufacturing method according to the one of the example embodiments of the invention and the electrode paste manufacturing system 1 that realizes this manufacturing method will be described with reference to FIG. 11. Here, the viscosity, number of bubbles in the paste, and amount of paste remaining and the like for both electrode paste according to related art and electrode paste manufactured according to each manufacturing method according to the example embodiments of the invention will be compared. In addition, the number of defects when a coat of each of these electrode pastes is applied will be compared. Also, the five patterns (i.e., pattern (1) to pattern (5)) shown in FIG. 11 correspond to each of the example embodiments described above. That is, the electrode paste of pattern (1) shown in FIG. 11 corresponds to an electrode paste manufactured using the electrode paste manufacturing system 1 according to the first example embodiment of the invention (i.e., manufactured according to the electrode paste manufacturing method according to the first example embodiment of the invention). Similarly, the electrode pastes of pattern (2) to pattern (5) shown in FIG. 11 correspond to electrode pastes manufactured using the electrode paste manufacturing systems 11, 21, 31, and 41 according to the second to the fifth example embodiments of the invention, respectively.

As shown in FIG. 11, the electrode paste manufactured according to the related manufacturing method has a viscosity of approximately 2350 (mPa×s). Also, the electrode pastes manufactured according to the manufacturing methods of pattern (1) to pattern (5) have a viscosity of approximately 2450 (mPa×s). Therefore, the electrode pastes manufactured according to pattern (1) to pattern (5) have a high solid factor and a high viscosity compared with the related art. That is, it is evident that with the electrode pastes manufactured according to the manufacturing methods of pattern (1) to pattern (5), bubbles are more difficult to remove with the related vacuum deaerating method.

However, as shown in FIG. 11, with the electrode paste manufactured according to the related manufacturing method, the number of bubbles in the paste is 300 or more. In contrast, with the electrode pastes manufactured according to the manufacturing methods of pattern (1) to pattern (5), the number of bubbles in the pastes is reduced to no more than 100 (27 to 78). That is, it is evident that with the electrode pastes manufactured according to the manufacturing methods of pattern (1) to pattern (5), although the solid factor and the viscosity are higher than they are with the related art, bubbles are able to be more reliably removed.

Also, as shown in FIG. 11, with the electrode paste manufactured according to the related manufacturing method, the top (e.g., the top 3 cm, i.e., from the surface to 3 cm deep) of the produced electrode paste includes a large amount of bubbles, so it is discarded. Therefore, 10% or more of the electrode paste that is produced is discarded. On the other hand, with the electrode pastes manufactured according to the manufacturing methods of pattern (1) to pattern (5), almost all of each electrode paste that is produced is able to be used because the bubble removal is promoted and there is no need to discard the top of the produced electrode paste. The amount of produced electrode paste that is discarded is able to be kept to no more than 2%. That is, with the electrode pastes manufactured according to the manufacturing methods of pattern (1) to pattern (5), the yield of the electrode paste is able to be improved, which also contributes to a reduction in the manufacturing cost of the secondary battery.

Also, as shown in FIG. 11, when the electrode paste manufactured according to the related manufacturing method was used to coat electrode foil, the number of coating defects was 100 or more. Here, the number of coating defects is the number of times there is a transparency of $\phi 0.3$ mm or more in 4000 meters of electrode foil, with 4000 meters of coated electrode foil (i.e., electrode foil with a coating length of 4000 meters) being one unit.

On the other hand, when the electrode pastes manufactured according to the manufacturing methods of pattern (1) to pattern (5) were used to coat electrode foil, the number of coating defects was no more than 10 (2 to 8), which is much less than the related art. Therefore, with the secondary battery manufactured using the electrode paste manufactured according to one of the electrode paste manufacturing methods of pattern (1) to pattern (5) of the example embodiments of the invention, the number of coating defects is small, so problems such as a tiny short circuit can be inhibited from occurring at the defect, and thus the quality of the secondary battery can be improved. Further, with the secondary battery manufactured using the electrode paste manufactured according to one of the electrode paste manufacturing methods of pattern (1) to pattern (5) of the example embodiments of the invention, the manufacturing cost of the electrode paste is reduced, so the cost of the secondary battery is also able to be reduced. As a result, a secondary battery of better quality than the related art is able to be provided at a lower cost than the related art.

That is, the electrode paste manufacturing methods according to the first to the fifth example embodiments of the invention are electrode paste manufacturing methods using the twin screw extrusion mixer 2. The inlet 4e of the mohno pump 4 is connected to the outlet of the twin screw extrusion mixer 2, and the outlet 4f of the mohno pump 4 is connected to the deaerating tank 6. Also, the inlet of the vacuum pump 7 is connected to the deaerating tank 6. The conduit system (i.e., the conduit 5) on the deaerating tank 6 side of an airtight line formed at the contact portion between the rotor 4b and the stator 4c of the mohno pump 4 forms a closed system with the airtight line being the boundary. Electrode paste is continuously vacuum deaerated inside the conduit system (i.e., the conduit 5) on the deaerating tank 6 side of the airtight line and inside the deaerating tank 6, by evacuating the deaerating tank 6 using the vacuum pump 7, and pressure-feeding the electrode paste to the deaerating tank 6 using the mohno pump 4 while keeping the conduit system (i.e., the conduit 5) on the deaerating tank 6 side of the airtight line in a vacuum state. Also, the electrode paste manufacturing systems 1, 11, 21, 31, and 41 according to the first to the fifth example embodiments of the invention include the twin screw extrusion mixer 2, the mohno pump 4, the deaerating tank 6, and the vacuum pump 7. The inlet 4e of the mohno pump 4 is connected to the outlet of the twin screw extrusion mixer 2, and the deaerating tank 6 is connected to the outlet 4f of the mohno pump 4. Also, the inlet of the vacuum pump 7 is connected to the deaerating tank 6. The conduit system (i.e., the conduit 5) on the deaerating tank 6 side of an airtight line formed at the contact portion between the rotor 4b and the stator 4c of the mohno pump 4 forms a closed system with the airtight line being the boundary. In this way, by transferring the electrode paste with the mohno pump 4, the conduit system (i.e., the conduit 5) from the mohno pump 4 to the deaerating tank 6 is able to be a closed system, and the vacuum deaerating process is able to be continuously performed without batch processing. As a result, the amount of time required to vacuum deaerate the electrode paste is able to be shortened.

Further, the secondary battery according to the example embodiment is manufactured using the electrode paste manufactured according to the electrode paste manufacturing method according to one of the first to the fifth example embodiments of the invention, or is manufactured using the electrode paste manufactured using the electrode paste manufacturing system according to one of the first to the fifth example embodiments of the invention. This kind of structure makes it possible to provide a higher quality secondary battery than the related art.

What is claimed is:

1. An electrode paste manufacturing method comprising:
   evacuating a deaerating tank to which an outlet of a mohno pump is connected, by a vacuum pump, such that a conduit system on the deaerating tank side of an airtight line formed at a contact portion between a rotor and a stator of the mohno pump is a closed system with the airtight line being a boundary, an inlet of the vacuum pump being connected to the deaerating tank, and an inlet of the mohno pump being connected to an outlet of a twin screw extrusion mixer; and
   continuously vacuum deaerating the electrode paste inside the conduit system on the deaerating tank side of the airtight line and inside the deaerating tank, by transferring the electrode paste to the deaerating tank using the mohno pump, while keeping the conduit system on the deaerating tank side of the airtight line in a vacuum state.

2. The manufacturing method according to claim 1, wherein the deaerating tank is evacuated by the vacuum pump such that the electrode paste is made to flow down along an inner wall surface of the deaerating tank so as to form a thin film of the electrode paste on the inner wall surface, and is then collected in a bottom portion of the deaerating tank.

3. The manufacturing method according to claim 2, further comprising:
   popping bubbles that appear in the thin film by discharging solvent toward the thin film with a nozzle provided in the deaerating tank and striking the bubbles with the solvent.

4. The manufacturing method according to claim 2, wherein the bubbles that appear in the thin film are popped by reducing a concentration of surfactant in the thin film by discharging solvent toward the inside of the deaerating tank by a nozzle provided in the deaerating tank and increasing a content ratio of the solvent in the thin film.

5. The manufacturing method according to claim 1, wherein
   the deaerating tank includes a retaining member that stands erect from the inner wall surface and retains the electrode paste;
   a slit portion that is a gap of a predetermined width is provided between the retaining member and the inner wall surface; and
   the deaerating tank is evacuated by the vacuum pump, such that the electrode paste that flows down along the inner wall surface passes through the slit portion.

6. The manufacturing method according to claim 1, wherein
   the deaerating tank includes a collecting portion that temporarily collects the electrode paste that has flowed into the deaerating tank;
   the collecting portion has an inclined portion that is a plate-shaped member that is connected to an edge over which the collected electrode paste overflows from the collecting portion, and inclines toward a lower side of the deaerating tank, and
   a dam member that stands erect from the inclined portion and retains the electrode paste that flows down the inclined portion;
   a slit portion that is a gap of a predetermined width is provided between the dam member and the inclined portion; and
   the deaerating tank is evacuated by the vacuum pump such that the electrode paste that flows down along the inclined portion passes through the slit portion.

* * * * *